United States Patent [19]
Erickson

[11] Patent Number: 5,253,927
[45] Date of Patent: Oct. 19, 1993

[54] TOOTHBRUSH RECYCLING APPARATUS AND METHOD

[76] Inventor: Kenneth R. Erickson, 12827 Camino Ramillette, San Diego, Calif. 92128

[21] Appl. No.: 819,996

[22] Filed: Jan. 13, 1992

[51] Int. Cl.$^5$ .................. A46D 1/045; A46D 1/08; A46D 9/04
[52] U.S. Cl. .................................. 300/2; 300/21; 425/11
[58] Field of Search ............ 300/2, 21; 264/243; 422/26; 206/362.1; 425/11

[56] References Cited

U.S. PATENT DOCUMENTS

| | | | |
|---|---|---|---|
| 1,157,751 | 10/1915 | Arthur | 425/11 |
| 2,794,696 | 6/1957 | Alves | 206/362.1 |
| 3,309,159 | 3/1967 | Le Sueur et al. | 312/206 |
| 3,353,905 | 11/1967 | Ellis | 21/102 |
| 3,961,893 | 6/1976 | Russell et al. | 21/95 |
| 4,214,657 | 7/1980 | Winston | 206/209.1 |
| 4,748,003 | 5/1988 | Riley | 422/112 |
| 4,772,418 | 9/1988 | Leoncavallo | 422/310 |
| 4,944,919 | 7/1990 | Powell | 422/26 |
| 5,127,521 | 7/1992 | Bourque | 206/362.1 |
| 5,158,342 | 10/1992 | Pai | 300/21 |

FOREIGN PATENT DOCUMENTS 2253694 6/1973 Fed. Rep. of Germany .
639554 12/1978 U.S.S.R. .

*Primary Examiner*—Irene Cuda
*Assistant Examiner*—John M. Husar
*Attorney, Agent, or Firm*—Brown, Martin, Haller & McClain

[57] ABSTRACT

Brushes such as toothbrushes are recycled in an apparatus having a mold chamber of shape and dimensions substantially matching that of the bristle part of the brush when new and unused. The mold chamber is mounted over a steam orifice of a steam chamber. The steam chamber has a heater for heating water in the chamber to produce steam. Steam entering the mold chamber softens the bristles into a moldable condition, after which the supply of steam is turned off and the bristles are allowed to cool in the mold chamber for a sufficient time for them to harden into a configuration substantially matching that of the mold chamber.

8 Claims, 1 Drawing Sheet

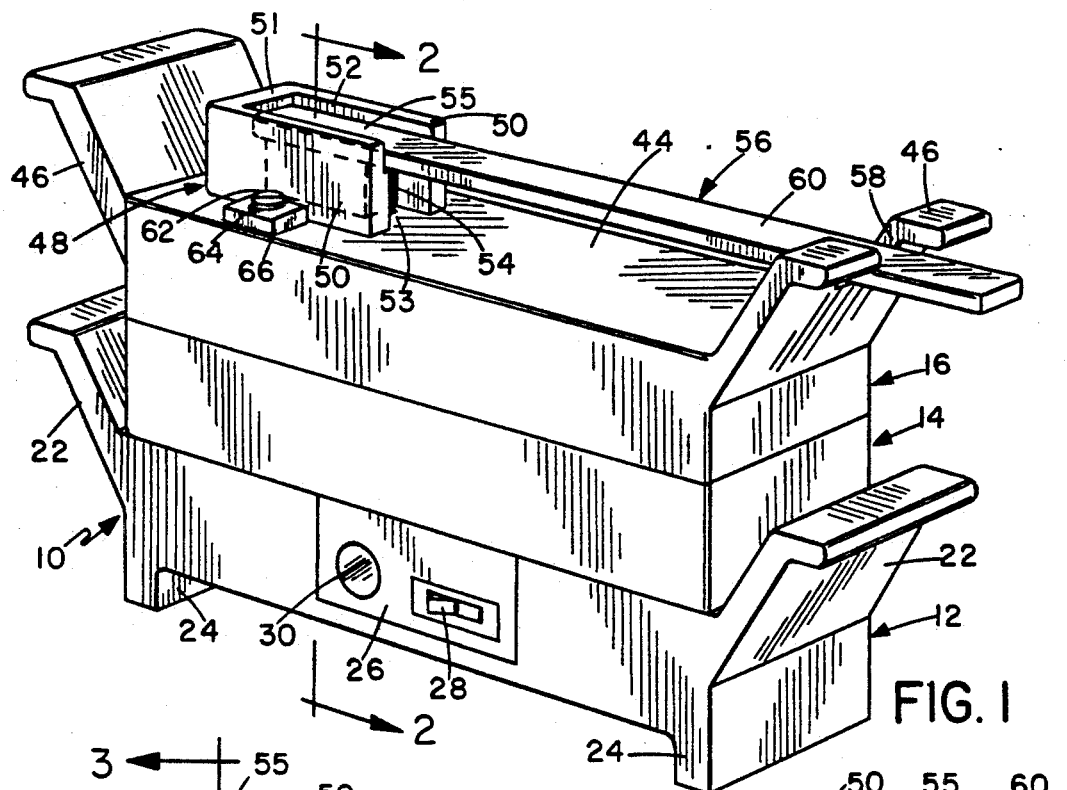
FIG. 1
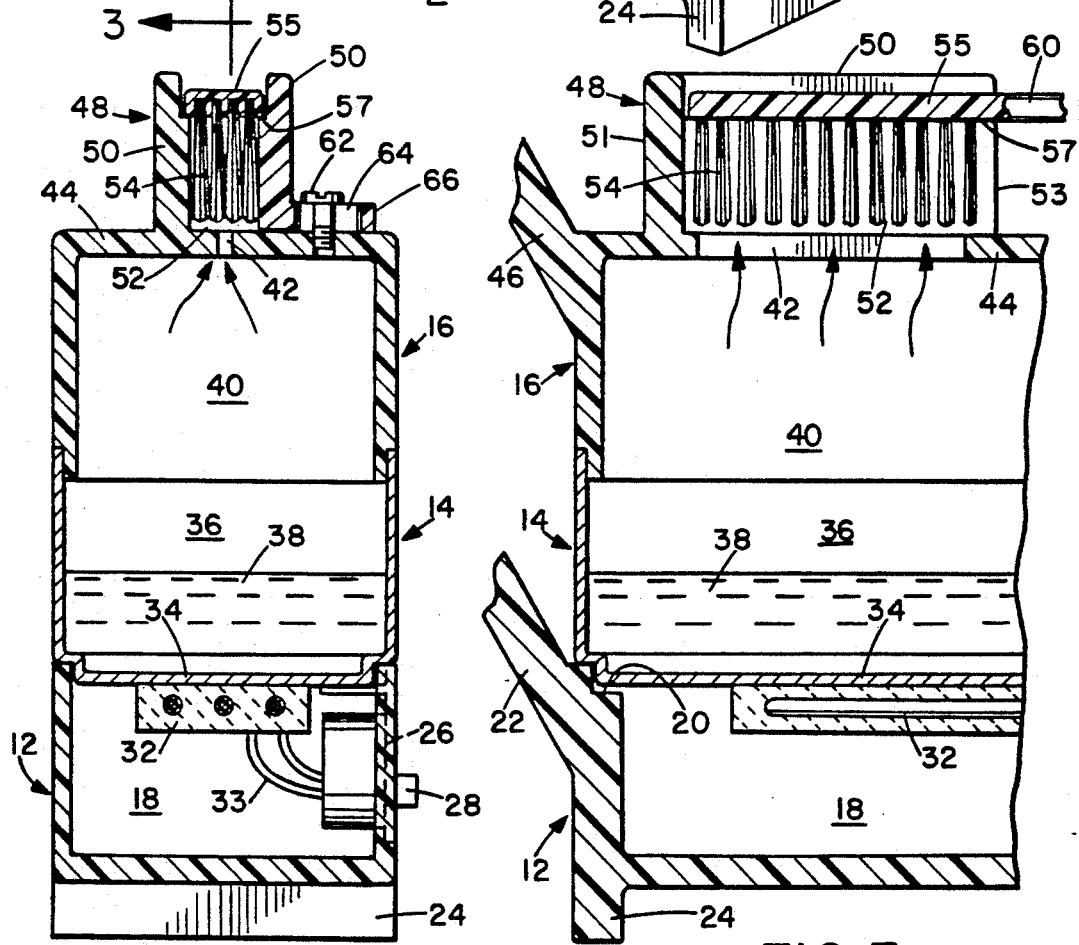
FIG. 2
FIG. 3

TOOTHBRUSH RECYCLING APPARATUS AND METHOD

BACKGROUND OF THE INVENTION

The present invention relates generally to an apparatus and method for recycling toothbrushes and other similar articles having a handle, a head, and bristles of moldable material such as plastic projecting from the head.

Toothbrushes generally wear out and must be discarded and replaced at relatively frequent intervals. Initially, the bristles extend substantially perpendicularly from the brush head in a generally parallel and straight fashion. With repeated use, the bristles become bent and damaged, splaying out from the head and reducing the effectiveness of brushing. It is generally recommended that brushes be replaced at intervals of no more than three months. Thus, each individual discards four or more toothbrushes per year, resulting in loss of valuable resources.

Equipment has been used in the past for sterilizing personal hygiene items such as toothbrushes, but this has typically involved directing ultraviolet light onto the head of the brush. This will not extend the lifetime of a brush or reduce wear.

Sterilization equipment is also used in dental offices and in other areas for sterilizing medical and dental implements, for example, by heating with steam.

SUMMARY OF THE INVENTION

It is an object of this invention to provide an apparatus for extending the useful life of toothbrushes and similar articles.

According to the present invention, a toothbrush recycling apparatus is provided which comprises a housing having a chamber for holding water, the chamber having an outlet orifice for allowing steam to exit from the chamber, a heater for heating water in the chamber to form steam, and a mold positioned on the outside of the housing over the steam orifice for receiving the bristle part of a toothbrush head. The mold has a mold chamber of shape and dimensions corresponding to those of the bristle part of the head. The chamber may be adjustable to conform to different brush head dimensions. A support is provided for supporting the handle of the brush with the head positioned over an open top of the mold and the bristles extending into the mold.

Preferably, the housing is in three separate parts, comprising a base or lower part for insulation of a heating element, a middle section for holding water and an upper part having an upper wall in which the steam outlet is located. The upper part may have handles for lifting it off the base and middle part after sufficient steam has been applied to soften the bristles, to allow it to cool rapidly. This allows the bristles to be re-shaped into substantially their original condition, while the steam will also act to sterilize the brush head. Thus, toothbrush lifetime can be significantly extended.

BRIEF DESCRIPTION OF THE DRAWINGS

The present invention will be better understood from the following detailed description of a preferred embodiment, taken in conjunction with the accompanying drawings, in which like reference numerals refer to like parts, and in which:

FIG. 1 is a perspective view of the toothbrush recycling apparatus according to a preferred embodiment of the invention;

FIG. 2 is an enlarged sectional view taken on line 2—2 of FIG. 1; and

FIG. 3 is s a sectional view taken on line 3—3 of FIG. 2.

DESCRIPTION OF THE PREFERRED EMBODIMENT

The drawings illustrate a toothbrush recycling apparatus 10 according to a preferred embodiment of the present invention. The apparatus basically comprises a base unit 12, an open-topped steam chamber unit 14 removably seated on base unit 12, and an upper cover unit 16 having an open bottom removably seated on the open top of steam chamber unit 14, as best illustrated in FIGS. 2 and 3, to form a rectangular housing assembly.

The base unit 12 comprises a generally rectangular, hollow, open-topped shell of insulating material such as plastic defining an internal chamber 18. A ledge 20 is provided at opposite ends of the shell for seating the steam chamber unit 14. Unit 12 has handles 22 at each end and downwardly depending feet 24 for supporting the unit spaced above a suitable supporting surface such as a table or washstand. A control panel 26 carrying an on-off switch 28 and indicator light 30 is provided on the front of unit 12, as best illustrated in FIG. 1. A suitable mains power input (not illustrated) will be connected to base unit 12.

A heating element 32 is secured to the lower surface of base wall 34 of steam chamber unit 14. Steam chamber unit 14 is a rectangular, metal housing having an inner chamber 36 for containing water 38. Heating element 32 is connected via internal wiring 33 in base unit 12 to the switch 28, which controls supply of power to the heating element as well as indicator light 30.

The cover unit 16 forms a downwardly directed, open bottomed steam collecting chamber 40 which is seated over the open upper end of the middle, steam chamber unit 14. It is preferably of a clear or darkened plastic material. A steam orifice 42 is provided in the top wall 44 of chamber 40. Cover unit 16 also preferably has handles 46 at each end. A mold device 48 is positioned on the top wall 44 of the unit over the steam orifice 42. The mold device has upstanding side walls 50 and at least one end wall 51 defining an internal mold chamber 52 of generally rectangular configuration with an open top and an opening 53 at one end opposite end wall 51. The chamber 52 has a shape and dimensions substantially matching those of the bristle part of a brush head, such as the bristle part 54 of the head 55 of toothbrush 56, while the steam orifice 42 is preferably a slot extending along substantially the entire length of the chamber, so that steam will be evenly dispersed over the bristles (see FIG. 3).

One of the side walls 50 is preferably adjustably mounted on the top wall 44, as best illustrated in FIG. 2, so that it can be moved in and out to accommodate different brush head sizes. The wall 50 is formed separately from the remainder of the mold chamber, and is secured on the top wall 44 via a screw 62 extending through an elongated slot 64 in a flange 66 projecting at right angles from the lower end of wall 50. The side walls have a step or ledge 57 on their inner faces, as best illustrated in FIG. 2. A seating recess 58 is provided in one of the handles 46 at substantially the same height as ledges 56, to act as a support for toothbrush handle 60.

The various units may be formed of suitable metal or heat resistant plastics material.

Operation of the apparatus will now be described in more detail. Water is first poured into the middle unit 14. The cover unit is then positioned over the open top of steam chamber unit 14. A toothbrush having worn and splayed out bristles is then placed on top of the cover unit with the bristle part 54 inserted in the mold chamber 52, for example by forcing the bristles through opening 53, with the side and end walls of the mold chamber holding the bristles inwardly in a generally perpendicular orientation. The movable side wall may be adjusted inwardly if necessary by loosening screw 62. The handle part 60 of the toothbrush will be supported on ledges 56 and handle recess 58, as illustrated in FIG. 1, while the head 55 is positioned in the open top of the mold chamber and seated on ledge 57. A separate handle support block may be provided on the top wall of the cover unit spaced from the mold chamber, if desired.

The power supply is then turned on to actuate the heating element and heat water in the chamber 36 to create steam. The cover unit forms a steam-collecting chamber 40 from which steam can escape via outlet orifice 42 into mold chamber 52. The bristles will become heated and softened into a moldable condition by the steam. After a sufficient time interval of about five minutes, the power supply is turned off and the cover unit is removed from the base and steam chamber unit. It is then left to cool down for a sufficient period of time for the bristles to harden, for example ten to fifteen minutes. The bristles will harden into a configuration substantially matching that of the mold chamber, and will therefore be returned to a straight orientation perpendicular to the handle, as generally illustrated in FIGS. 2 and 3. Thus, toothbrushes can be re-shaped to substantially their original form, significantly extending their usable lifetime. This apparatus may be used for re-cycling other types of brushes having plastic bristles, in a similar manner, by providing suitable mold cavities of shape and size corresponding to the respective brush heads.

This apparatus allows toothbrushes and other types of brushes to be restored to their original shapes any number of times, while the steam will also act to clean and sterilize the brushes. This significantly increases the effective lifetime of brushes, reducing both expenditure and waste.

Although a preferred embodiment of the invention has been described above by way of example only, it will be understood by those skilled in the field that modifications may be made to the disclosed embodiment without departing from the scope of the invention, which is defined by the appended claims.

I claim:

1. A recycling apparatus for brushes having moldable bristles, comprising:
   a housing having a chamber for receiving water;
   heater means for heating the water in the chamber to produce steam;
   the chamber having at least one outlet orifice for allowing steam to escape from the chamber;
   a mold positioned over said outlet orifice, the mold having a mold chamber of shape and dimensions substantially matching those of the bristle part of a brush head and an entry opening for insertion of a brush head into the mold chamber, the mold chamber communicating with said outlet orifice; and
   the mold having upstanding spaced side walls and at least one end wall defining a rectangular mold chamber open at one end for insertion and removal of the bristle part of a brush head.

2. The apparatus as claimed in claim 1, further including support means spaced from said mold for supporting the handle of a brush with at least the bristle part of the brush head positioned in the mold chamber.

3. The apparatus as claimed in claim 2, wherein said mold has an open upper end and said support means comprises a raised support on said cover unit for supporting the handle of the brush in alignment with the open upper end of the mold cavity.

4. The apparatus as claimed in claim 1, wherein the housing is in at least three parts, comprising a base part, a middle unit for containing water, the unit having an open upper end, and an upper cover unit for fitting over the open upper end of the middle unit, the cover unit having a steam-collecting chamber communicating with the interior of the middle unit and having an upper wall in which the outlet orifice is located, the cover unit and middle unit having releasable mating formations for releasably seating the cover unit on the middle unit.

5. The apparatus as claimed in claim 4, wherein the upper part has handles for lifting the upper part off the lower part of the housing.

6. The apparatus as claimed in claim 4, wherein the base unit and middle unit having releasable mating formations for releasably seating the middle unit on the base unit.

7. The apparatus as claimed in claim 1, wherein one side wall of the mold is adjustable to change the dimensions of the mold chamber.

8. A method of recycling brushes, comprising the steps of:
   placing the bristle part of a used brush in a mold chamber of shape and dimensions substantially matching those of the bristle part when new;
   connecting the mold chamber to a supply of steam for a period of time sufficient to soften the bristles to a moldable condition;
   cutting off the supply of steam to the mold cavity and allowing the bristles to cool for a sufficient time period for the bristles to harden into a configuration substantially matching that of the mold chamber; and
   removing the brush from the mold chamber.

* * * * *